United States Patent
Trim et al.

(10) Patent No.: US 12,225,605 B2
(45) Date of Patent: Feb. 11, 2025

(54) OBJECT ATTRIBUTION DERIVATION VIA CROWD-SOURCED OPTICAL SENSORS

(71) Applicant: INTERNATIONAL BUSINESS MACHINES CORPORATION, Armonk, NY (US)

(72) Inventors: Craig M. Trim, Ventura, CA (US); Mauro Marzorati, Lutz, FL (US); Zachary A. Silverstein, Jacksonville, FL (US); Martin G. Keen, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/804,534

(22) Filed: Feb. 28, 2020

(65) Prior Publication Data
US 2021/0274576 A1 Sep. 2, 2021

(51) Int. Cl.
*H04W 76/14* (2018.01)
*G16Y 20/40* (2020.01)
*H04W 48/12* (2009.01)

(52) U.S. Cl.
CPC ........... *H04W 76/14* (2018.02); *H04W 48/12* (2013.01); *G16Y 20/40* (2020.01)

(58) Field of Classification Search
CPC ....... H04W 76/14; H04W 48/12; G16Y 20/40
USPC ........................................................ 709/217
See application file for complete search history.

(56) References Cited

U.S. PATENT DOCUMENTS

| | | | |
|---|---|---|---|
| 9,589,255 B1 | 3/2017 | Sandrew | |
| 9,641,977 B2 | 5/2017 | Diacetis | |
| 9,936,114 B2 | 4/2018 | Baym | |
| 10,306,128 B2 * | 5/2019 | Eramian | .......... H04N 5/232933 |

(Continued)

FOREIGN PATENT DOCUMENTS

| | | |
|---|---|---|
| AU | 2013260683 C1 | 5/2019 |
| EP | 3236402 A1 | 10/2017 |

(Continued)

OTHER PUBLICATIONS

Anonymous, "Automatic Real-Time Photo Distribution for Mobile Devices", Disclosed Anonymously, IP.com No. IPCOM000245318D, IP.com Electronic Publication Date: Feb. 29, 2016, pp. 1-5.
(Continued)

*Primary Examiner* — Wing F Chan
*Assistant Examiner* — John Fan
(74) *Attorney, Agent, or Firm* — Michael O'Keefe

(57) ABSTRACT

A method, computer system, and computer program product for utilizing crowdsourcing of images captured by individuals to determine the status of a subject is provided. The embodiment may receive, by a processor associated with a broad beacon, an impulse. The embodiment may also transmit a request to each client device within a preconfigured distance through the broad beacon based on the received impulse. The embodiment may further, in response to an acceptance of the transmitted request by a user associated with a client device, initializing a pairing sequence between the client device and an aimable beacon. The embodiment may also transmit information to identify a subject of photographic capture from the aimable beacon to the client device. The embodiment may further receive an image captured by the user based on the received information.

20 Claims, 6 Drawing Sheets

(56) References Cited

U.S. PATENT DOCUMENTS

| | | | |
|---|---|---|---|
| 2008/0297608 A1 | 12/2008 | Border | |
| 2012/0094713 A1 | 4/2012 | Renou | |
| 2013/0095855 A1* | 4/2013 | Bort | G06T 17/05 |
| | | | 455/456.2 |
| 2014/0287778 A1* | 9/2014 | Jones | H04W 4/021 |
| | | | 455/456.3 |
| 2016/0055538 A1* | 2/2016 | Todasco | G06Q 30/0269 |
| | | | 705/14.58 |
| 2017/0221241 A1* | 8/2017 | Hannah | G06V 20/176 |
| 2018/0146134 A1 | 5/2018 | Tyson | |
| 2019/0182415 A1* | 6/2019 | Sivan | G06F 3/013 |

FOREIGN PATENT DOCUMENTS

| | | |
|---|---|---|
| JP | 3160898 B2 * | 4/2001 |
| KR | 101403104 B1 | 6/2014 |
| WO | 2018049515 A1 | 3/2018 |

OTHER PUBLICATIONS

Frost, "IBM developing AI-powered IoT software to help manage aging infrastructure", Traffic Technology Today, Infrastructure, Smart Cities, Traffic Management, https://www.traffictechnologytoday.com/news/infrastructure/ibm-developing-ai-powered-iot-software-to-help-manage-aging-infrastructure.html, Apr. 26, 2019, pp. 1-4.

Hoang, "Detection of Surface Crack in Building Structures Using Image Processing Technique with an Improved Otsu Method for Image Thresholding", Advances in Civil Engineering, vol. 2018, Article ID 3924120, https://doi.org/10.1155/2018/3924120, Received Oct. 11, 2017; Revised Mar. 3, 2018; Accepted Mar. 14, 2018; Published Apr. 2, 2018, 10 pages.

IBM, "Use enterprise asset management (EAM) to optimize operations", https://www.ibm.com/internet-of-things/solutions/enterprise-asset-management/eam, accessed Sep. 20, 2019, 10 pages.

Mell et al., "The NIST Definition of Cloud Computing", National Institute of Standards and Technology, Special Publication 800-145, Sep. 2011, 7 pages.

* cited by examiner

OBJECT ATTRIBUTION DERIVATION VIA CROWD-SOURCED OPTICAL SENSORS

BACKGROUND

The present invention relates generally to the field of computing, and more the Internet of Things (IoT).

IoT relates to an interrelated system of objects that are capable of transferring data across a network without requiring human participation. Currently, many devices available in the consumer marketplace are equipped with "smart" capabilities which include the capability to connect to a network through wired or wireless connections. These devices include many items from smartphones and wearables to refrigerators, lightbulbs, and vehicles. Despite many known uses in the commercial sphere, IoT can also be utilized industrially to improve efficiency and reduce consumable resources. For example, implementing IoT technology throughout a city transportation or electrical grid may assist in reduction of traffic or inefficient energy usage.

SUMMARY

According to one embodiment, a method, computer system, and computer program product for utilizing crowd-sourcing of images captured by individuals to determine the status of a subject is provided. The embodiment may receive, by a processor associated with a broad beacon, an impulse. The embodiment may also transmit a request to each client device within a preconfigured distance through the broad beacon based on the received impulse. The embodiment may further, in response to an acceptance of the transmitted request by a user associated with a client device, initializing a pairing sequence between the client device and an aimable beacon. The embodiment may also transmit information to identify a subject of photographic capture from the aimable beacon to the client device. The embodiment may further receive an image captured by the user based on the received information.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
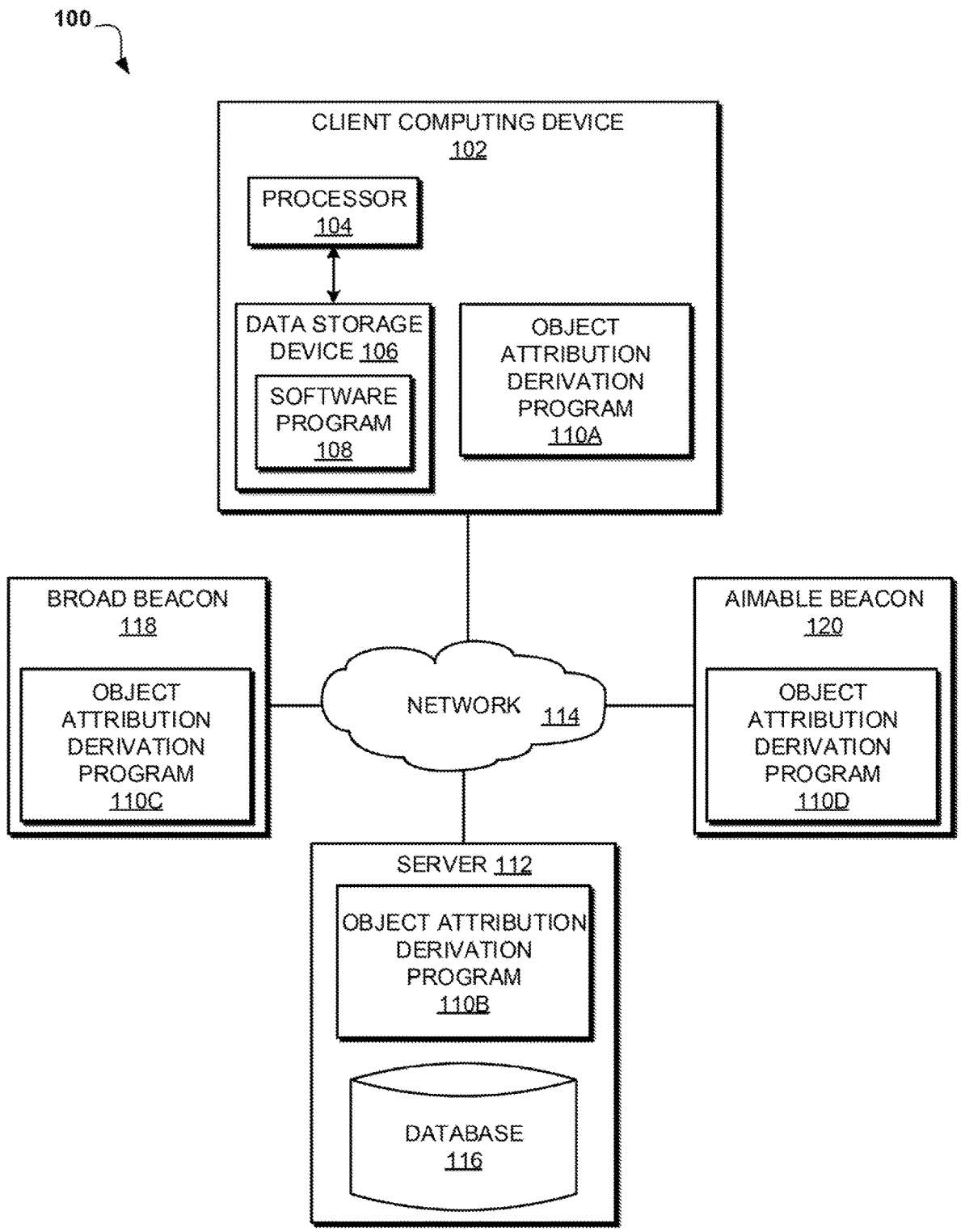
FIG. 1 illustrates an exemplary networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

Embodiments of the present invention relate to the field of computing, and more particularly to the Internet of Things (IoT). The following described exemplary embodiments provide a system, method, and program product to, among other things, utilize crowdsourcing of images captured by individuals to determine the status of a subject. Therefore, the present embodiment has the capacity to improve the technical field of IoT through a periodic monitoring the status and quality of deployed assets, products, structures, etc.

As previously described, IoT relates to an interrelated system of objects that are capable of transferring data across a network without requiring human participation. Currently, many devices available in the consumer marketplace are equipped with "smart" capabilities which include the capability to connect to a network through wired or wireless connections. These devices include many items from smartphones and wearables to refrigerators, lightbulbs, and vehicles. Despite many known uses in the commercial sphere, IoT can also be utilized industrially to improve efficiency and reduce consumable resources. For example, implementing IoT technology throughout a city transportation or electrical grid may assist in reduction of traffic or inefficient energy usage.

However, the ever-increasing prevalence of IoT devices in the public sphere may result in a need to monitor the status of assets, products, and structures as well as the deployed IoT devices themselves. For example, the appearance of a public place, such as a park or a store display, may provide a motivation for monitoring the current status of the public place using IoT devices. Similarly, in public safety situations, authorities commonly request photographs or videos from individuals of incidents that may present information to aid in investigations since many current monitoring devices, such as security cameras, may be fixed and only view a single angle. As such, it may be advantageous to, among other things, implement a mechanism to capture images of particular locations and elements to allow for periodic status monitoring of the location or elements.

According to at least one embodiment, a broad beaconing mechanism and a narrow beaconing mechanism may be utilized to capture images of a location or element. The broad beaconing mechanism may be fixed to a point of which capture of an image is desired. At periodic intervals or upon the occurrence of preconfigured events, the broad beacon may trigger a request for a picture to be captured. Upon determining a user with an opted-in device is within a preconfigured distance and has accepted the request, the narrow, or aimable, beacon may pair with the user device to share telemetric information as to the location or element in need of image capture. For example, if an individual carrying a smartphone walks within a preconfigured distance of the broad beacon, an alert may be transmitted to the user smartphone that an image of the location or element is desired. If the user accepts the image capture request, the aimable beacon may pair with the user device to share telemetric information. Upon capture, the image of the location or element may be transmitted to the aimable beacon for storage and analysis. In at least one embodiment, the individual capturing the image of the location or element may be compensated with a preconfigured incentive.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method, and program product to monitor the status of deployed assets, products, locations, or structures using IoT devices that engage with nearby opted-in user devices to capture images that can be stored and compared over time to determine current status and degradation over time.

Referring to FIG. 1, an exemplary networked computer environment 100 is depicted, according to at least one embodiment. The networked computer environment 100 may include client computing device 102, a server 112, a broad beacon 118, and an aimable beacon 120 interconnected via a communication network 114. According to at least one implementation, the networked computer environment 100 may include a plurality of client computing devices 102, servers 112, broad beacons 118, and aimable beacons 120, of which only one of each is shown for illustrative brevity.

The communication network 114 may include various types of communication networks, such as a wide area network (WAN), local area network (LAN), a telecommunication network, a wireless network, a public switched network and/or a satellite network. The communication network 114 may include connections, such as wire, wireless communication links, or fiber optic cables. It may be appreciated that FIG. 1 provides only an illustration of one implementation and does not imply any limitations with regard to the environments in which different embodiments may be implemented. Many modifications to the depicted environments may be made based on design and implementation requirements.

Client computing device 102 may include a processor 104 and a data storage device 106 that is enabled to host and run a software program 108 and an object attribution derivation program 110A and communicate with the server 112, broad beacon 118, and aimable beacon 120 via the communication network 114, in accordance with one embodiment of the invention. Client computing device 102 may be, for example, a mobile device, a telephone, a personal digital assistant, a netbook, a laptop computer, a tablet computer, a desktop computer, or any type of computing device capable of running a program and accessing a network. As will be discussed with reference to FIG. 4, the client computing device 102 may include internal components 402a and external components 404a, respectively.

The server computer 112 may be a laptop computer, netbook computer, personal computer (PC), a desktop computer, or any programmable electronic device or any network of programmable electronic devices capable of hosting and running an object attribution derivation program 110B and a database 116 and communicating with the client computing device 102, broad beacon 118, and aimable beacon 120 via the communication network 114, in accordance with embodiments of the invention. As will be discussed with reference to FIG. 4, the server computer 112 may include internal components 402b and external components 404b, respectively. The server 112 may also operate in a cloud computing service model, such as Software as a Service (SaaS), Platform as a Service (PaaS), or Infrastructure as a Service (IaaS). The server 112 may also be located in a cloud computing deployment model, such as a private cloud, community cloud, public cloud, or hybrid cloud.

The broad beacon 118 may be a device placed nearby, or embedded within, an object of which photographic monitoring is desired. The broad beacon 118 may be any programmable electronic device or any network of programmable electronic devices capable of hosting and running an object attribution derivation program 110C and communicating with the client computing device 102, server 112, and aimable beacon 120 via the communication network 114, in accordance with embodiments of the invention. The broad beacon 118 may also be capable of broadcasting a unique ID, telemetrics, and other relevant details on fixed time intervals or upon satisfaction of conditional variances. Additionally, the broad beacon 118 may be capable of modifying signal strength between short-range signals and long-range signals depending upon desired distance of photographic capture.

The aimable beacon 120 may be a device capable of performing a pairing sequence and transmitting data to and receiving from data a user device, such as a smartphone. The aimable beacon may be any programmable electronic device or any network of programmable electronic devices capable of hosting and running an object attribution derivation program 110D and communicating with the client computing device 102, server 112, and broad beacon 118 via the communication network 114, in accordance with embodiments of the invention.

Furthermore, the aimable beacon 120 may be capable of transmitting telemetric information of the specific location or element in need of capture through various methods, such as a visible indicator, an audible cue, an indoor positioning system, and visual classification attributes. In at least one embodiment, upon successful capture, the aimable beacon 120 may receive a transfer of the image or video through various methods, such as tap-to-transfer, near field communication (NFC), ultra-high frequency broadcast (e.g., Bluetooth), and a cloud upload. In at least one other embodiment, the captured image may be uploaded from the object attribution derivation program 110D hosted by the aimable beacon 120 to the object attribution derivation program 110B and/or database 116 within server 112. In at least one other embodiment, the aimable beacon 120 may contain a repository, such as database 116 depicted within server 112, in which the captured image may be stored.

According to the present embodiment, the object attribution derivation program 110A-D may be a program capable of triggering a broadcast from the broad beacon 118, receiving a broadcast from broad beacon 118, pairing a connection and transferring image capture information with aimable beacon 120, transferring a captured image to aimable beacon 120, storing a captured image within aimable beacon 120, transferring an image to server 112, storing an image within database 116, and verifying the depicted elements within the captured image through known image recognition techniques. The object attribution derivation program 110A-D may be partially or fully hosted within client computing device 102, server 112, broad beacon 118, and/or aimable beacon 120. For illustrative purposes, the object attribution derivation program 110A-D is depicted in FIG. 1 as being hosted within each device (i.e., client computing device 102, server 112, broad beacon 118, and aimable beacon 120). However, the object attribution derivation program 110A-D may be hosted in any one of or any combination of the depicted devices. In at least one embodiment, the object attribution derivation program 110A within client computing device 102 may transfer a captured image or video to object attribution derivation program 110B or database 116 within server 112 rather than to aimable beacon 120. The object attribution derivation method is explained in further detail below with respect to FIG. 2.

Figure 2:
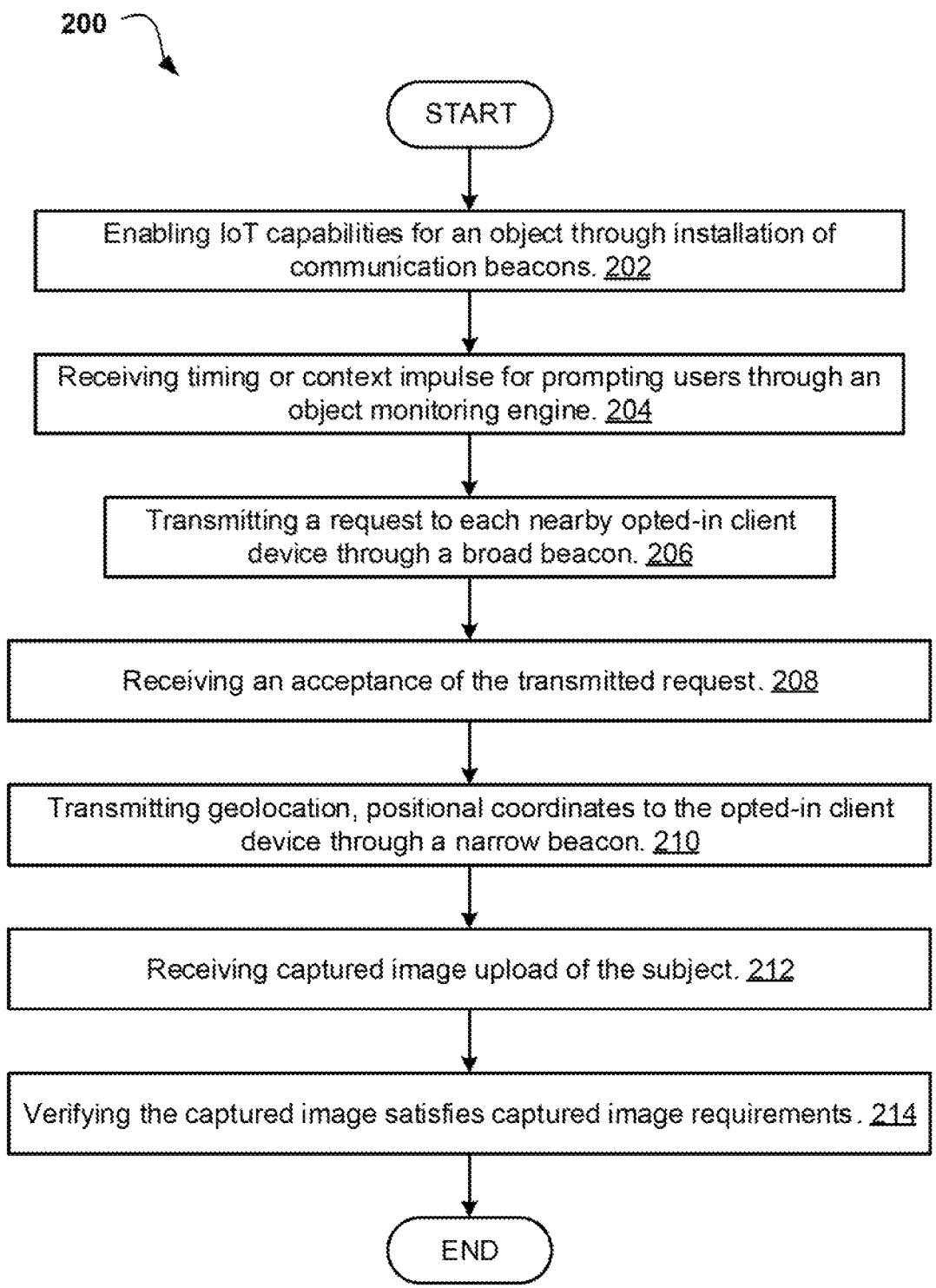
FIG. 2 illustrates an operational flowchart of an object attribution derivation process according to at least one embodiment.

Referring now to FIG. 2, an operational flowchart illustrating an object attribution derivation process 200 is depicted according to at least one embodiment. At 202, the object attribution derivation program 110A-D enables IoT capabilities of a subject through installation of communication beacons. In order to provide IoT capabilities of the subject, a broad beacon 118 may be placed nearby a subject for photographic capture. In at least one embodiment, the broad beacon 118 may be embedded within the subject. In at least one other embodiment, the subject of photographic capture may be an object or a location. Once placed nearby or embedded within the subject, the broad beacon 118 may be configured by the object attribution derivation program 110A-D to allow for IoT capabilities. As part of the enablement of the broad beacon 118, the object attribution derivation program 110A-D may configure the broad beacon to seek photographic capture of the subject based on a fixed time interval or upon conditional variance.

Then, at 204, the object attribution derivation program 110A-D receives a timing or context impulse for prompting users through an object monitoring engine. As previously described, the object attribution derivation program 110A-D may seek photographic capture of the subject after a preconfigured fixed time interval or upon conditional variance. For example, if photographic capture is based on a fixed time interval, the object attribution derivation program 110A-D may be configured to seek photographic capture every 30 minutes. Similarly, if photographic capture is based upon conditional variance, the object attribution derivation program 110A-D may seek photographic capture of the subject when a threshold number of opted-in users of the object attribution derivation program 110A-D are within preconfigured threshold distance of the subject. Additionally, a manual impulse may be received by the object attribution derivation program 110A-D from a user, developer, or administrator when photographic capture is needed for some other reason. For example, if photographic capture of the subject is required to support an investigation at that moment and an opted-in user is nearby.

Next, at 206, the object attribution derivation program 110A-D transmits a request to each nearby opted-in client device through a broad beacon. Upon receiving the impulse, the object attribution derivation program 110A-D may transmit a request through the broad beacon 118 to nearby user devices, such as client computing device 102. The strength of the signal broadcast by the object attribution derivation program 110A-D through the broad beacon 118 may be modified based on the desired distance for photographic capture. For example, a short-range signal may be utilized for close range photographic needs or when opted-in users are nearby the broad beacon 118. Conversely, a long-range signal may be utilized for photographic images that need to be taken further away from the subject or when fewer opted-in users are nearby the broad beacon 118 to receive the signal.

When enabled, the signal broadcast by the broad beacon 118 may include a unique ID, telemetrics, and, optionally, details of the desired photographic capture. The unique ID may be an identification number related to a particular broad beacon, such as broad beacon 118. The telemetrics may relate to the approximate location of the object for which photographic capture is sought. The optional details may include additional information desired for inclusion in the transmission to opted-in users, such as a reason that photographic capture is being sought and a promotional offer for a successful photographic capture by a user.

Then, at 208, the object attribution derivation program 110A-D receives an acceptance of the transmitted request. Once a transmission is received, a user may interact with a graphical user interface of a user device, such as client computing device 102, to confirm an acceptance of the transmitted request for photographic capture of the subject. For example, if a user receives a transmission from a nearby broad beacon, such as broad beacon 118, that photographic capture of a deployed asset is sought, the user may receive a push notification on the graphical user interface of the user device. Through interactions with the graphical user interface, the user may confirm that the request for photographic capture is accepted and the user will proceed with capturing the requested photograph of the subject.

Next, at 210, the object attribution derivation program 110A-D transmits geolocation, positional coordinates to the opted-in client device through a narrow location. Once the user selects to engage with the request, the object attribution derivation program 110A-D may begin a pairing sequence with aimable beacon 120. The object attribution derivation program 110A-D may utilize an ultrasound transmission through a speaker of the client computing device 102 to accept the request for photographic capture. Once pairing is established, the aimable beacon 120 may provide more detailed information to the object attribution derivation program 110A-D as to the subject of the photographic capture. The information may be presented in a variety of methods, such as visible light indicator, audible cuing, an indoor positioning system, and/or visual classification attributes. The visible light indicator may provide a visual indicator, such as a directional laser light, projected from the aimable beacon 120 that indicates where the user should stand and orient an image capture device in order to obtain a photographic capture of the subject. The audible cuing may be an auditory clip played from one or speakers communicatively coupled to or embedded within the aimable beacon 120 that identifies the location of the subject for photographic capture. The indoor positioning system may provide the coordinates of the subject to the client computing device 120, which may then be displayed to the user on a graphical user interface. The visual classification attributes may provide precise classification attributes of the subject that enable a visual recognition service on a mobile device, such as client computing device 102, to detect the subject. For example, the visual classification attributes projected or displayed to a user when the subject is a store display may identify the subject as being located on the "second shelf from top, items in black".

Then, at 212, the object attribution derivation program 110A-D receives a captured image upload of the subject. Once the user captures an image of the subject, the user may upload the captured image from the user device to the aimable beacon 120 or to the object attribution derivation program 110B in the server 112. Where the image is being transmitted to the aimable beacon 120, the captured image may be transmitted via a variety of transfer methods, such as tap-to-transfer, near field communication (NFC), ultra-high frequency broadcast (e.g., Bluetooth), and a cloud upload.

Next, at 214, the object attribution derivation program 110A-D verifies the captured image satisfies captured image requirements. Upon reception of the captured image, the object attribution derivation program 110A-D may verify the captured image depicts the subject and all desired attributes of the subject. For example, in the earlier example of a store display, the object attribution derivation program 110A-D may utilize image recognition technology to determine that the image contains the specific display and products of which image capture is desired.

Figure 3:
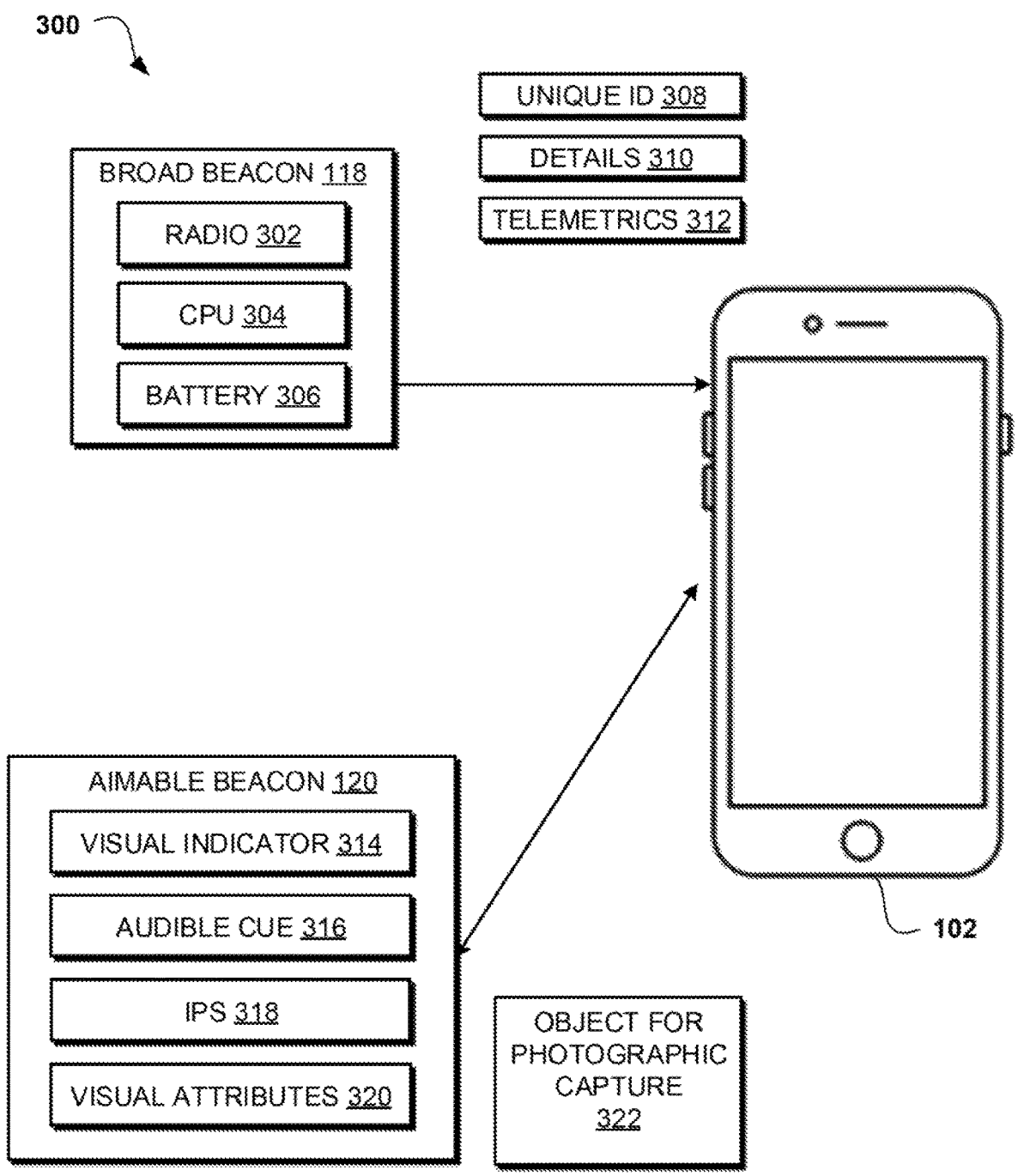
FIG. 3 illustrates components utilized in an object attribution derivation process according to at least one embodiment.

Referring now to FIG. 3, components utilized in an object attribution derivation process according to at least one embodiment are depicted. In an alternate embodiment of the exemplary networked computer environment 100 described in FIG. 1, a client computing device 102, a broad beacon 118, and an aimable beacon 120 may be communicatively coupled through a network, such as network 114. The broad beacon 118 may include a radio 302, a central processing unit (CPU) 204, and a battery 306. At preconfigured intervals or upon the satisfaction of a preconfigured condition, the broad beacon may transmit a request to nearby user devices, such as client computing device 102, through the radio 302. The request may include a unique ID 308, details 310, and telemetrics 312, as previously described in step 206. Once the object attribution derivation program 110A-D receives an acceptance of the request sent by the broad beacon 118, a pairing sequence with the aimable beacon 120 is initiated. The aimable beacon 120 may transmit information to identify the object for photographic capture 322 to the user to the client computing device 102 through a variety of methods, such as visible light indicator 314, audible cuing 316, an indoor positioning system 318, and/or visual classification attributes 320. Thereafter, the user may proceed with capturing an image of the object for photographic capture 322, or the subject, and proceed to uploading of the image for verification.

It may be appreciated that FIGS. 2 and 3 provide only an illustration of one implementation and does not imply any limitations with regard to how different embodiments may be implemented. Many modifications to the depicted environments may be made based on design and implementation requirements. For example, in at least one embodiment, the individual capturing the image of the location or element may be compensated with a preconfigured incentive, such as a financial incentive (e.g., discount, commission, one-time monetary payment, etc.) or a non-financial incentive (e.g., profile status points within an app, personal enrichment, private or public recognition, etc.).

In at least one other embodiment, the depicted environments may be utilized to detect changes to inanimate objects or locations over a period of time and/or from varying angles. For example, multiple users may capture images of a subject in a given area from different perspectives and with varying quality to allow analysis of the subject over time.

In yet another embodiment, after a preconfigured period of time or a preconfigured number of images or videos of the subject have been uploaded, the object attribution derivation program 110A-D may generate a report of the subject that illustrates the status of the subject. For example, the object attribution derivation program 110A-D may be preconfigured to have images of a deployed asset captured biweekly and to generate a report on the asset once a year. After a year of asset deployment, the object attribution derivation program 110A-D may generate a report that shows the progressive status of the asset throughout the year then transmit the asset to a user for review.

Figure 4:
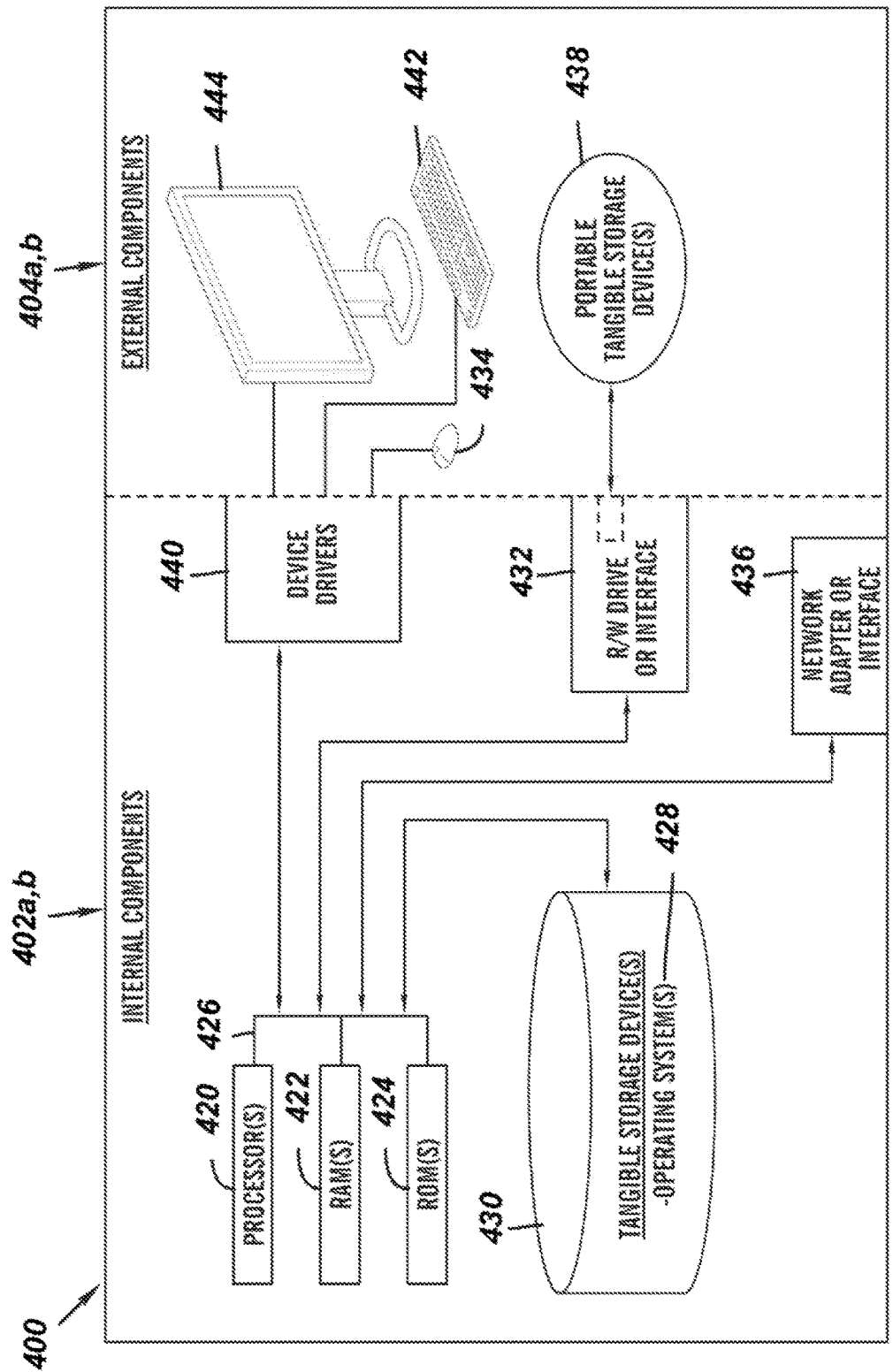
FIG. 4 is a block diagram of components of a computing device of internal and external components of computers and servers depicted of FIG. 1 according to at least one embodiment.

FIG. 4 is a block diagram 400 of internal and external components of the client computing device 102, the server 112, the broad beacon 118, and the aimable beacon 120 depicted in FIG. 1 in accordance with an embodiment of the present invention. It should be appreciated that FIG. 4 provides only an illustration of one implementation and does not imply any limitations with regard to the environments in which different embodiments may be implemented. Many modifications to the depicted environments may be made based on design and implementation requirements.

The data processing system 402, 404 is representative of any electronic device capable of executing machine-readable program instructions. The data processing system 402, 404 may be representative of a smart phone, a computer system, PDA, or other electronic devices. Examples of computing systems, environments, and/or configurations that may represented by the data processing system 402, 404 include, but are not limited to, personal computer systems, server computer systems, thin clients, thick clients, handheld or laptop devices, multiprocessor systems, microprocessor-based systems, network PCs, minicomputer systems, and distributed cloud computing environments that include any of the above systems or devices.

The client computing device 102, the server 112, the broad beacon 118, and the aimable beacon 120 may include respective sets of internal components 402 a,b and external components 404 a,b illustrated in FIG. 4. Each of the sets of internal components 402 include one or more processors 420, one or more computer-readable RAMs 422, and one or more computer-readable ROMs 424 on one or more buses 426, and one or more operating systems 428 and one or more computer-readable tangible storage devices 430. The one or more operating systems 428, the software program 108 and the in object attribution derivation program 110A in the client computing device 102, the in object attribution derivation program 110B in the server 112, the object attribution derivation program 110C in the broad beacon 118, and the object attribution derivation program 110B in the aimable beacon 120 are stored on one or more of the respective computer-readable tangible storage devices 430 for execution by one or more of the respective processors 420 via one or more of the respective RAMs 422 (which typically include cache memory). In the embodiment illustrated in FIG. 4, each of the computer-readable tangible storage devices 430 is a magnetic disk storage device of an internal hard drive. Alternatively, each of the computer-readable tangible storage devices 430 is a semiconductor storage device such as ROM 424, EPROM, flash memory or any other computer-readable tangible storage device that can store a computer program and digital information.

Each set of internal components 402 a, b also includes a R/W drive or interface 432 to read from and write to one or more portable computer-readable tangible storage devices 438 such as a CD-ROM, DVD, memory stick, magnetic tape, magnetic disk, optical disk or semiconductor storage device. A software program, such as the object attribution derivation program 110A-D, can be stored on one or more of the respective portable computer-readable tangible storage devices 438, read via the respective R/W drive or interface 432, and loaded into the respective hard drive 430.

Each set of internal components 402 a,b also includes network adapters or interfaces 436 such as a TCP/IP adapter cards, wireless Wi-Fi interface cards, or 3G or 4G wireless interface cards or other wired or wireless communication links. The software program 108 and the object attribution derivation program 110A in the client computing device 102, the object attribution derivation program 110B in the server 112, the object attribution derivation program 110C in the broad beacon 118, and the object attribution derivation program 110D in the aimable beacon 120 can be downloaded to the client computing device 102, the server 112, the broad beacon, and the aimable beacon 120 from an external computer via a network (for example, the Internet, a local area network or other, wide area network) and respective network adapters or interfaces 436. From the network adapters or interfaces 436, the software program 108 and the object attribution derivation program 110A in the client computing device 102, the object attribution derivation program 110B in the server 112, the object attribution derivation program 110C in the broad beacon 118, and the object attribution derivation program 110D in the aimable beacon 120 are loaded into the respective hard drive 430. The network may comprise copper wires, optical fibers, wireless transmission, routers, firewalls, switches, gateway computers and/or edge servers.

Each of the sets of external components 404 a,b can include a computer display monitor 444, a keyboard 442, and a computer mouse 434. External components 404 a,b can also include touch screens, virtual keyboards, touch pads, pointing devices, and other human interface devices. Each of the sets of internal components 402 a,b also includes device drivers 440 to interface to computer display monitor 444, keyboard 442, and computer mouse 434. The device drivers 440, R/W drive or interface 432, and network adapter or interface 436 comprise hardware and software (stored in storage device 430 and/or ROM 424).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
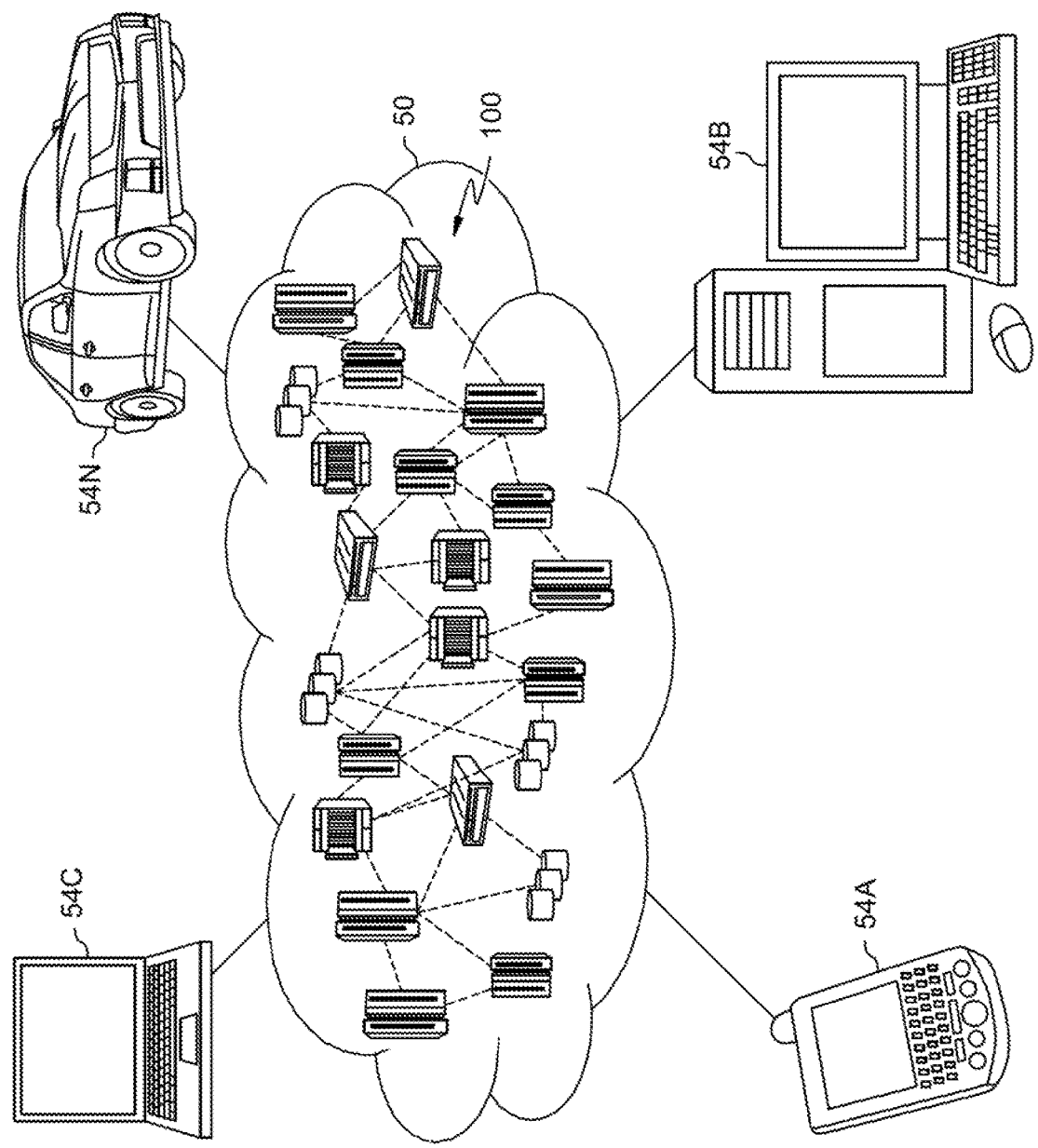
FIG. 5 depicts a cloud computing environment according to an embodiment of the present invention.

Referring now to FIG. 5, illustrative cloud computing environment 50 is depicted. As shown, cloud computing environment 50 comprises one or more cloud computing nodes 100 with which local computing devices used by cloud consumers, such as, for example, personal digital assistant (PDA) or cellular telephone 54A, desktop computer 54B, laptop computer 54C, and/or automobile computer system 54N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 100 and cloud computing environment 50 can communicate with any type of computerized device over any type of network and/or network addressable connection (e.g., using a web browser).

Figure 6:
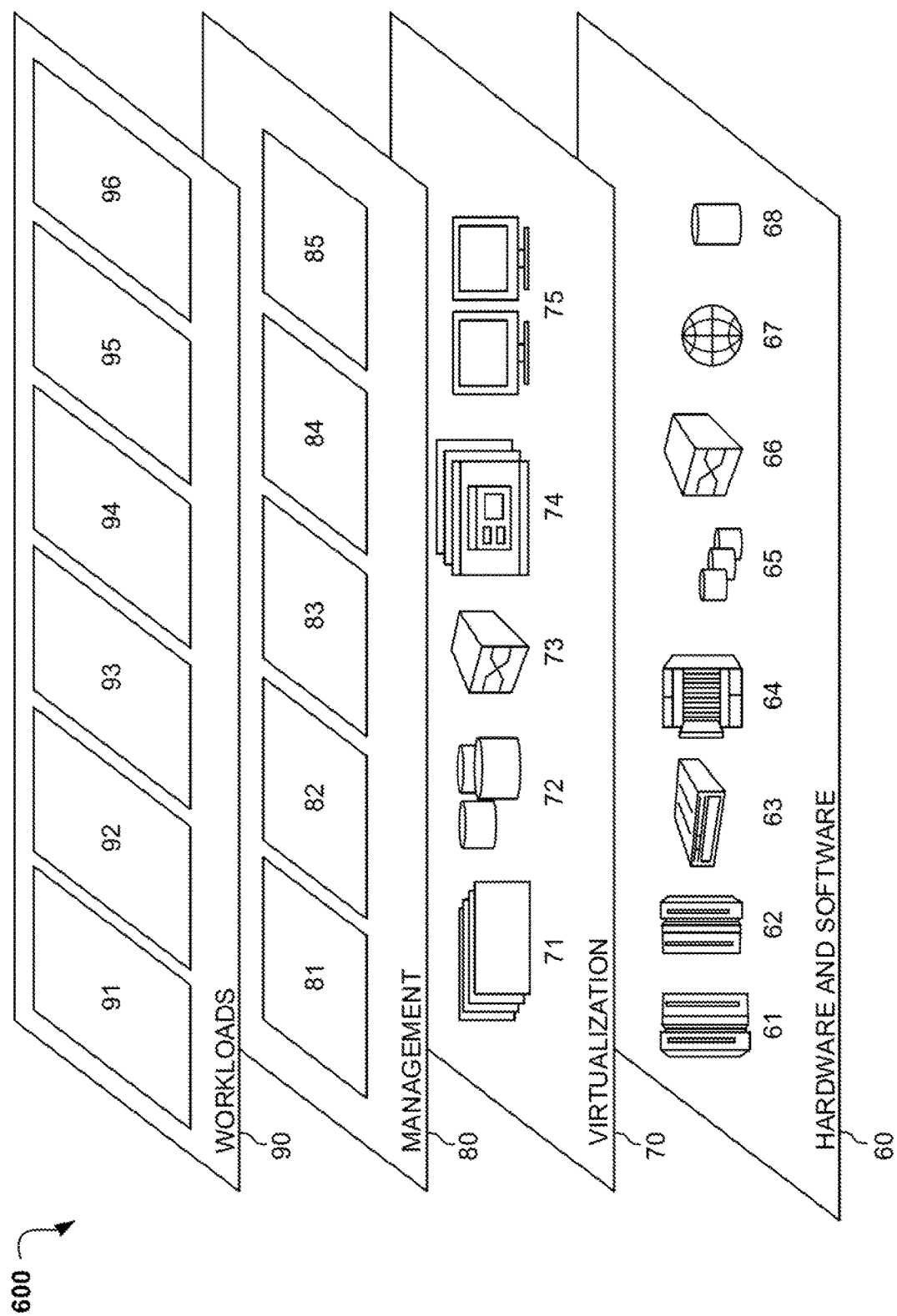
FIG. 6 depicts abstraction model layers according to an embodiment of the present invention.

Referring now to FIG. 6, a set of functional abstraction layers 600 provided by cloud computing environment 50 is shown. It should be understood in advance that the components, layers, and functions shown in FIG. 4 are intended to be illustrative only and embodiments of the invention are not limited thereto. As depicted, the following layers and corresponding functions are provided:

Hardware and software layer 60 include hardware and software components. Examples of hardware components includes mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include mapping and navigation 91; software development and lifecycle management 92; virtual classroom education delivery 93; data analytics processing 94; transaction processing 95; and object attribution derivation 96. Object attribution derivation 96 may relate to utilizing a broad beaconing mechanism and a narrow beaconing mechanism to capture images of a location or element in order to determine changes to the location or element over time and/or from various angles.

The descriptions of the various embodiments of the present invention have been presented for purposes of illustration but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A processor-implemented method, the method comprising:
   receiving, by a processor associated with a broad beacon, an impulse;
   transmitting a request to each client device within a preconfigured distance through the broad beacon based on the received impulse;
   in response to an acceptance of the transmitted request by a user associated with a client device, establishing a data connection between the client device and an aimable beacon;
   transmitting information to identify an asset as a subject of photographic capture from the aimable beacon to the client device;
   receiving an image of the subject captured by the user based on the received information; and
   in response to receiving a preconfigured number of images of the subject being uploaded, generating a report documenting a status of the subject based on the images.

2. The method of claim 1, wherein transmission of the impulse is conducted in a fixed time interval or upon a manual trigger.

3. The method of claim 1, where a signal used to transmit the request is a short-range signal or a long-range signal based on a desired distance of photographic capture.

4. The method of claim 1, wherein the request includes a unique ID and a plurality of telemetrics.

5. The method of claim 1, wherein the information is received from the aimable beacon through a transmission method, and wherein the transmission method is selected from a group consisting of visible light indicator, audible cuing, and an indoor positioning system.

6. The method of claim 1, further comprising:
   uploading the received image to a repository associated with the aimable beacon.

7. The method of claim 1, further comprising:
   in response to receiving the captured image, providing an incentive to the user.

8. A computer system comprising:
   one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:
   receiving, by a processor associated with a broad beacon, an impulse;
   transmitting a request to each client device within a preconfigured distance through the broad beacon based on the received impulse;
   in response to an acceptance of the transmitted request by a user associated with a client device, establishing a data connection between the client device and an aimable beacon;
   transmitting information to identify an asset as a subject of photographic capture from the aimable beacon to the client device;
   receiving an image of the subject captured by the user based on the received information; and in response to receiving a preconfigured number of images of the subject being uploaded, generating a report documenting a status of the subject based on the images.

9. The computer system of claim 8, wherein transmission of the impulse is conducted in a fixed time interval or upon a manual trigger.

10. The computer system of claim 8, where a signal used to transmit the request is a short-range signal or a long-range signal based on a desired distance of photographic capture.

11. The computer system of claim 8, wherein the request includes a unique ID and a plurality of telemetrics.

12. The computer system of claim 8, wherein the information is received from the aimable beacon through a transmission method, and wherein the transmission method is selected from a group consisting of visible light indicator, audible cuing, and an indoor positioning system.

13. The computer system of claim 8, further comprising:
uploading the received image to a repository associated with the aimable beacon.

14. The computer system of claim 8, further comprising:
in response to receiving the captured image, providing an incentive to the user.

15. A computer program product comprising:
one or more non-transitory computer-readable tangible storage media and program instructions stored on at least one of the one or more non-transitory tangible storage media, the program instructions executable by a processor capable of performing a method, the method comprising:
receiving, by a processor associated with a broad beacon, an impulse;
transmitting a request to each client device within a preconfigured distance through the broad beacon based on the received impulse;
in response to an acceptance of the transmitted request by a user associated with a client device, establishing a data connection between the client device and an aimable beacon;
transmitting information to identify an asset as a subject of photographic capture from the aimable beacon to the client device;
receiving an image of the subject captured by the user based on the received information; and
in response to receiving a preconfigured number of images of the subject being uploaded, generating a report documenting a status of the subject based on the images.

16. The computer program product of claim 15, wherein transmission of the impulse is conducted in a fixed time interval or upon a manual trigger.

17. The computer program product of claim 15, wherein a signal used to transmit the request is a short-range signal or a long-range signal based on a desired distance of photographic capture.

18. The computer program product of claim 15, wherein the request includes a unique ID and a plurality of telemetrics.

19. The computer program product of claim 15, wherein the information is received from the aimable beacon through a transmission method, and wherein the transmission method is selected from a group consisting of visible light indicator, audible cuing, and an indoor positioning system.

20. The computer program product of claim 15, further comprising:
uploading the received image to a repository associated with the aimable beacon.

* * * * *